United States Patent [19]

West

[11] Patent Number: 5,323,991
[45] Date of Patent: Jun. 28, 1994

[54] LANTERN HOLDER

[76] Inventor: Jerry L. West, 8011 Deer Trail, Dallas, Tex. 75238

[21] Appl. No.: 44,704

[22] Filed: Apr. 12, 1993

[51] Int. Cl.[5] .................................................. F16L 3/00
[52] U.S. Cl. ...................................... 248/121; 43/21.2; 248/156; 248/513; 248/520
[58] Field of Search ............... 248/512, 513, 514, 538, 248/545, 156, 175, 121, 520; 43/21.2, 27.4; 362/415, 431

[56] References Cited

U.S. PATENT DOCUMENTS

| D. 239,015 | 3/1976 | Stout | 43/21.2 X |
|---|---|---|---|
| 2,598,130 | 5/1952 | Mallison | 248/231.7 |
| 2,934,298 | 4/1960 | Aleskin | 248/512 X |
| 3,306,560 | 2/1967 | Wheeler | 248/538 |
| 3,969,620 | 7/1976 | Brooks | 240/7.5 |
| 3,998,418 | 12/1976 | Boulanger | 248/309 R |
| 4,096,951 | 6/1978 | Menssen | 248/156 X |
| 4,429,350 | 1/1984 | Guthrie | 362/120 |
| 4,625,937 | 12/1986 | Haase | 248/156 X |
| 4,938,446 | 7/1990 | Williams | 43/21.2 X |
| 5,108,058 | 4/1992 | White | 248/156 X |

Primary Examiner—J. Franklin Foss
Attorney, Agent, or Firm—Timmons & Kelly

[57] ABSTRACT

The bail of a lantern is hung on a bail hook on the end of an extension arm, extending from the upper end of a straight rod. The rod is held vertical by a base. The bottom of the lantern is held be a hook on the rod, so that the longitudinal axis of the lantern is not parallel to the rod. A pair of fishing rod holders are also attached to the rod.

8 Claims, 2 Drawing Sheets

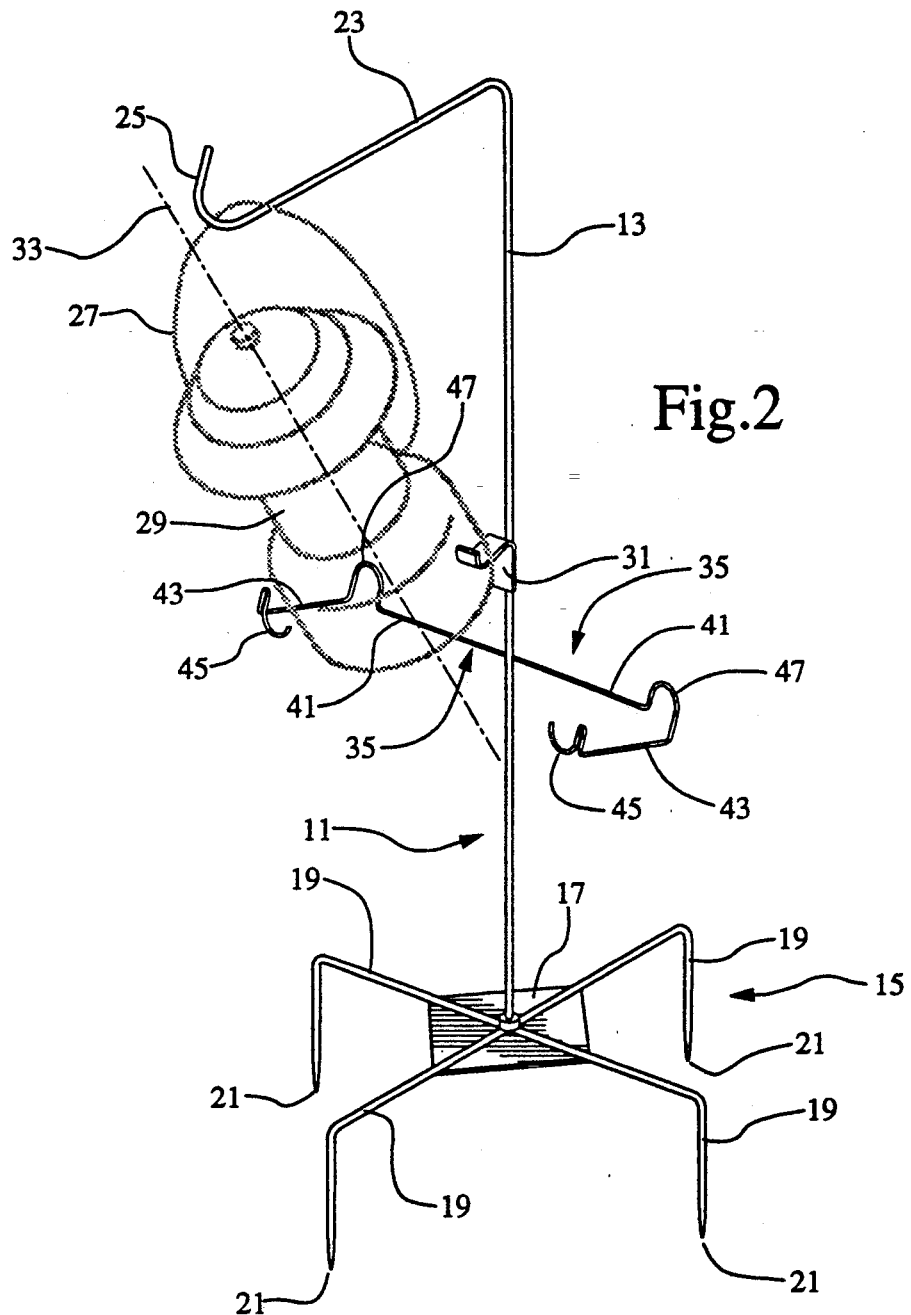

LANTERN HOLDER

BACKGROUND OF THE INVENTION

1. Field of the Invention

This invention relates in general to lantern holders. In particular, the invention relates to devices for holding lanterns for people who are fishing at night.

2. Description of the Prior Art

Fishing at night is a very popular sport. Fish such as catfish, eels, sturgeon and carp have a well-developed sense of smell, and can be caught at night, as well as during the day. Other species, such as steelheads, bluefish, striped bass, and large mouth bass can also be caught at night, using still bait. Crappie and catfish are especially attracted to areas of water that are illuminated.

Night fishing requires a light, such as a lantern. The float, or the line itself, must be observed, so that the hook can be set when a bite occurs. Also, light is needed for baiting the hook, unhooking the fish, and other related tasks. Conventional lanterns, having a pivoting bail, may be hung from a tree branch or from a lantern holder.

Prior art lantern holders generally include a hook on which the bail handle of the lantern can be hung. The lantern then hangs downward from the bail handle. When hung in such a manner, the lantern generally emits the majority of its light horizontally, rather than downward toward the water. It was desired to have a lantern holder that would hold the lantern at an angle, so that the lantern would emit its light downward toward the water.

SUMMARY OF THE INVENTION

The general object of the lantern holder of the invention is to hold a lantern at an angle, so that the lantern will shine downward toward the water. In general, this object is accomplished by a lantern holder having an extension arm extending from the upper end of a vertical rod. A bail hook on the end of the extension arm holds the bail handle of the lantern, and a lantern hook on the rod holds the bottom of the lantern. The lantern is thus held at an angle to the rod, so that the light shines downward toward the water.

The lantern holder of the invention also has a pair of fishing rod holders, so that one or two fishing rods can be hung on the lantern holder. The lantern holder will thus hold a lantern and two fishing rods.

The above, as well as additional objects, features, and advantages of the invention will become apparent in the following detailed description.

BRIEF DESCRIPTION OF THE DRAWINGS

FIG. 2 is a perspective view of the lantern holder of the invention.

DESCRIPTION OF THE PREFERRED EMBODIMENT

Figure 1:
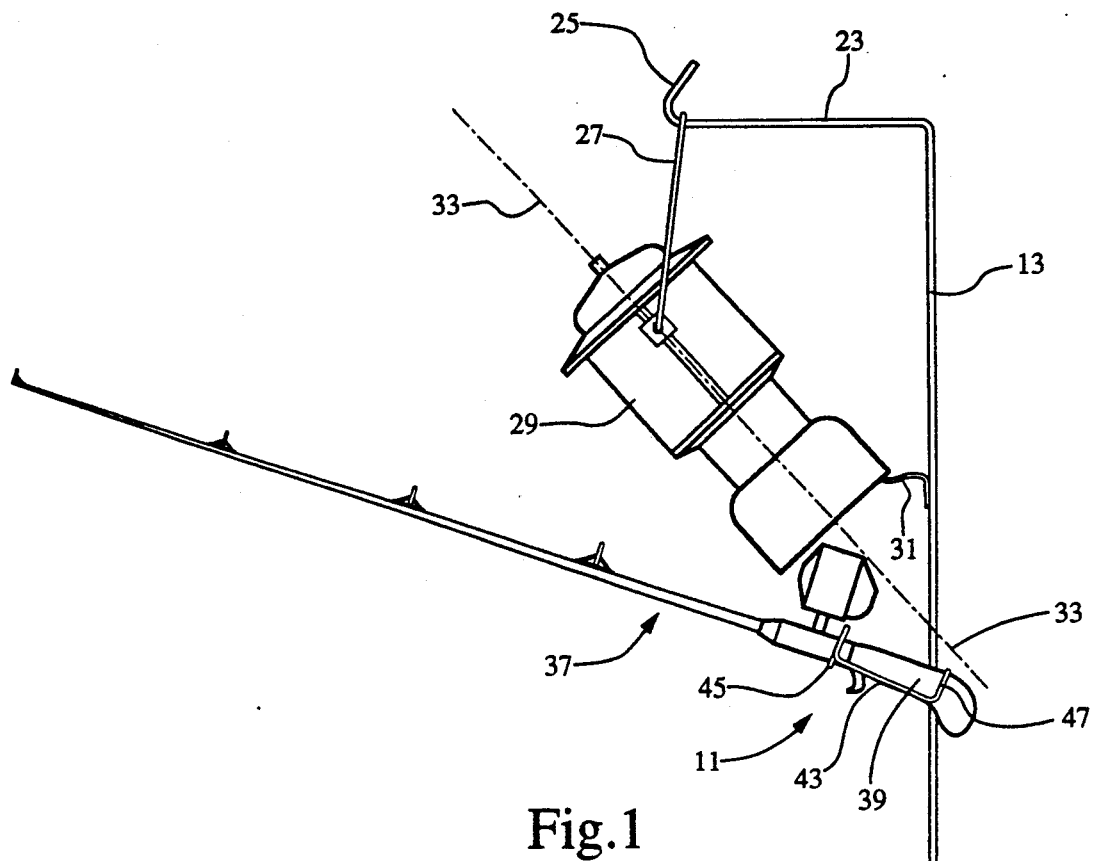
FIG. 1 is a side elevation of a lantern holder according to the invention.

The lantern holder 11 of the invention has a straight rod 13, about four feet long and made of galvanized steel or other suitable material. The lower end of the rod 13 is attached to a base 15, for supporting the rod 13 in a vertical attitude.

The base 15 may be simply a sharp end on the lower end of the rod 13, or a more complex arrangement. In the preferred embodiment, the base 15 includes a planar plate 17 and four bent legs 19, extending outward and then downward from the lower end of the rod 13. The plate 17 provides a place to place a foot when pushing the base 15 into the ground. The bent legs 19 have sharp ends 21 to facilitate insertion into the ground.

A one-foot-long extension arm 23 is connected to the rod 13, and extends horizontally away from the rod 13. The proximate end the extension arm 23 is connected to the upper end of the rod 13.

A bail hook 25 is attached to the distal end of the extension arm 23. The pivoting bail 27 of a lantern 29 can be placed over the extension arm 23 and the bail hook 25 will keep the bail 27 from slipping off of the extension arm 23.

A lantern hook 31 is welded onto the rod 13 at a point about one and a half feet down from the upper end of the rod 13. The lantern hook 31 can hold the bottom of the lantern near the rod 13, as shown in the drawings. The longitudinal axis 33 of the lantern 29 is thus held at an angle that is not parallel to the rod 13. This causes the light of the lantern 29 to be directed downward away from the rod 13.

The lantern holder 11 of the invention also has a fishing rod holder 35 attached to the rod 13. The fishing rod holder 35 is designed to hold a pair of fishing rods 37, wherein each fishing rod 37 has a handle 39, as shown in FIG. 1.

The fishing rod holder 37 includes two support members 41 attached to the rod 13. The support members 41 are collinear and the proximate ends of the support members 41 are connected to each other and to the rod 13. The distal ends of the support members 41 are opposite one another and the support members 41 are perpendicular to the extension arm 23.

A fishing rod grip 43 is attached to the distal end of each support member 41. Each fishing rod grip 43 has a forward hook 45 for supporting the weight of the handle 39, and a rearward hook 47 for holding down on the end of the handle 39.

The lantern holder 11 of the invention has several advantages over the prior art. The lantern 29 is held at a angle, so that the light from the lantern 29 is pointed downward at the water. The lantern holder 11 is easy and inexpensive to manufacture and to use. Further, the lantern holder 11 of the invention includes pair of fishing rod holders 35 for holding a pair of fishing rods 37.

The invention has been described in only one embodiment. It should be apparent to those skilled in the art that the invention is not so limited, but is susceptible to various changes and modifications without departing from the spirit of the invention.

I claim:

1. A lantern holder for holding a lantern having a pivoting bail handle and a bottom, comprising:
   a rod, having an upper end and a lower end;
   an extension arm having a distal end and a proximate end attached to the upper end of the rod;
   a bail hook on the distal end of the extension arm for holding the bail handle of the lantern;
   a lantern hook on the rod for holding the bottom of the lantern, so that the longitudinal axis of the lantern is not parallel to the rod; and
   a fishing rod holder attached to the rod for holding a fishing rod in a plane parallel to the longitudinal axis of the lantern.

2. A lantern holder as recited in claim 1, further comprising a base on the lower end of the rod for holding the rod upright.

3. A lantern holder as recited in claim 1, further comprising a base on the lower end of the rod for holding the rod upright, wherein the base includes a foot piece extending perpendicular to the rod.

4. A lantern holder as recited in claim 1, wherein the angle between the rod and the longitudinal axis of the lantern is approximately 45°.

5. A lantern holder as recited in claim 1, wherein the extension arm is about four times as long as the rod is tall.

6. A lantern holder as recited in claim 1, wherein the rod is about four feet tall.

7. A lantern holder as recited in claim 1, wherein the fishing rod holder further comprises:
   a support member having a distal end and a proximate end attached to the rod; and
   a fishing rod grip attached to the distal end of the support member.

8. A lantern holder as recited in claim 7, wherein the fishing rod grip has a forward hook for supporting the weight of the fishing rod and a rearward hook for holding down on a handle on the fishing rod.

* * * * *